United States Patent [19]

Sansone et al.

[11] Patent Number: 5,019,991

[45] Date of Patent: May 28, 1991

[54] CERTIFIED WEIGHER-SHORT PAID MAIL

[75] Inventors: Ronald P. Sansone, Weston, Conn.; Raymond Keating, Purdys, N.Y.; Joseph W. Wall; Robert T. Durst, Jr., both of Monroe, Conn.

[73] Assignee: Pitney Bowes Inc., Stamford, Conn.

[21] Appl. No.: 285,146

[22] Filed: Dec. 16, 1988

[51] Int. Cl.$^5$ .............................................. G07B 17/02
[52] U.S. Cl. ........................... 364/464.03; 177/25.15
[58] Field of Search ............... 177/25.15; 364/464.02, 364/464.03

[56] References Cited

U.S. PATENT DOCUMENTS

| | | | |
|---|---|---|---|
| 4,339,807 | 7/1982 | Uchimura et al. | 177/25.15 X |
| 4,339,891 | 9/1982 | Uchimura et al. | 177/25.15 X |
| 4,351,033 | 9/1982 | Uchimura et al. | 177/25.15 X |
| 4,366,552 | 12/1982 | Uchimura et al. | 177/25.15 X |
| 4,511,793 | 4/1985 | Racanelli | 364/466 X |
| 4,649,266 | 3/1987 | Eckert | 364/464.02 X |
| 4,713,761 | 12/1987 | Sharpe et al. | 364/406 |
| 4,778,018 | 10/1988 | Cordery et al. | 177/210 FP |
| 4,780,835 | 10/1988 | Sievei et al. | 364/464.02 X |
| 4,849,884 | 7/1989 | Axelrod et al. | 364/406 |
| 4,873,645 | 10/1989 | Hunter et al. | 364/464.02 X |
| 4,888,803 | 12/1989 | Pastor | 364/464.03 X |

Primary Examiner—Felix D. Gruber
Assistant Examiner—Edward R. Cosimano
Attorney, Agent, or Firm—Peter Vrahotes; Melvin J. Scolnick; David E. Pitchenik

[57] ABSTRACT

A system for certifying correctly accounted postage payment, the system includes an input for entering transactional mail run data and a data processor coupled to the input. Documents to be certified are fed along a document feed path, and certain parameters for the documents are determined. A printer under the control of the data processor, then places a certification imprint upon the documents after necessary accounting is done.

9 Claims, 4 Drawing Sheets

CERTIFIED WEIGHER-SHORT PAID MAIL

RELATED APPLICATION

Commonly-assigned U.S. application Ser. No. 285,891, filed concurrently, describes and claims some aspects of the subject matter described and claimed in this application.

BACKGROUND OF THE INVENTION

This invention relates to data processing systems for automatically correcting and accounting for improperly applied postage in short paid mail. Short paid mail constitutes a major problem in postal delivery systems. Short paid mail is mail that does not have sufficient postage to cover the cost of shipping under current laws and regulations. This can be, for example, due to the fact that the mail was posted for presort discount and there were insufficient mail pieces in a particular zip to qualify. Alternatively the mail may have been posted for a weight limit discount, and may exceed the weight limit. Short paid mail is identified by the postal service as part of their acceptance procedure. However, the acceptance procedure varies from postal service to postal service and is extremely costly. For example there are mail pieces which are posted with 17½ cents taking advantage of presort and truly should be posted at 25 cents. The cost to the postal service of getting the differential far exceeds the money actually recovered. The purpose for the collection activity, however, is to ensure that short paid mail does not become habitual on the part of the user.

Short paid mail is corrected by either returning it to the sender where more postage is added or by sending it on to the recipient for payment by the recipient. Both arrangements are costly to the postal service and also are not very effective.

It is therefore the object of the present invention to provide a method and apparatus for correctly and automatically calculating the proper postage on a mailing based on appropriate guidelines, and certifying said mail piece as correct.

Methods and apparatus for centralizing the processing of accounting and payment functions on a transactional basis are known. For example, U.S. Pat. No. 4,713,761, issued Dec. 15, 1987 and assigned to the assignee of the present application describes such a system. In such systems, accounts are maintained by means of appropriate input information, such as a bill of lading or a manifest. Manifest systems are microcomputer based systems which input various pieces of information and from which ultimate rates may be posted in accordance with previously defined rate tables stored in data bases or the like. In addition, U.S. Pat. No. 5,005,124, relates to shared service concepts wherein certain postal functions are performed by the user.

BRIEF DESCRIPTION OF THE PRESENT INVENTION

The two principal corroboration sources of information for verification purposes are a counter, for counting the quantity of mail, and a scale, for measuring the weight of mail. The principal data input devices for the system are key operated, document scanning or the like for data input derived either from a manifest, containing information for a bulk mail run, or from the envelope itself which may contain evidence of appropriate coding representatives of a previously posted pre-sort discount.

The present invention solves the forgoing problem by providing a computer system which includes a calibrated scale which is designed to be acceptably certified by appropriate authorities or by qualified designated individuals or companies. The invention includes a method and apparatus for checking for improper posting based on parameters as count and weight and pre-stored data which provide information relating to appropriately applied laws and regulations for calculation for correct postage, taking all appropriate factors into account, debiting the accounting system accordingly, and then certifying the mail piece as correct. More particularly, a weigh-on-the-fly scale may be used which may be calibrated for the U.S. Postal Service by Pitney Bowes and is certified to be functioning accurately by the Postal Authorities the manufacturer or others. The scale may be periodically inspected, as meters presently are, or may be inspected by telephone sampling. The certified scale is a link to evidence of postage payment, which can be in the form of a readable key line on the mail piece, such key line being in the form of an indicia or an encryption printed on the mail piece. Funds can be handled by electronic funds transfer, remote recharging or in other systems. Where short paid mail occurs, as for example, where weighted mail is being marked with an indicia for a presort discount and/or a bundling discount and it is determined that this discount is not properly available, in conjunction with the evidence of postage payment already coded or read into the system, the system may debit an advance deposit account for adjusting electronically for the short paid mail. The advantage to the user is that no mail is returned for short payment. This is a particular concern to very large mailers that put out billings, and advertising and the like. It is of value to the post office because it eliminates the costly acceptance procedures.

Important to the concept is that an indication be placed on the mail piece to indicate that it has gone through the particular process and should be delivered regardless of the apparent short payment.

In addition to human readability, a method and apparatus may be provided at the central postal service wherein the certification may be automatically read and verified as valid. This is accomplished by reading both the imprinted postal indicia which may contain an encrypted code, as well as the certification, which may contain a similar encrypted code. These codes are compared in a central processor with regard to previously stored data in memory, the previously stored data including a correct or authentic representation of the imprinted postal indicia as well as a correct or authentic representation of the certification code. The codes may be interrelated by means of appropriate encryption keys and verification confirmed by means of appropriate comparisons. Acceptance or rejection based upon verification of the certification can then be made. As a result, the service requirements on the part of the postal service are substantially reduced.

DETAILED DESCRIPTION OF THE PRESENT INVENTION

Figure 1:
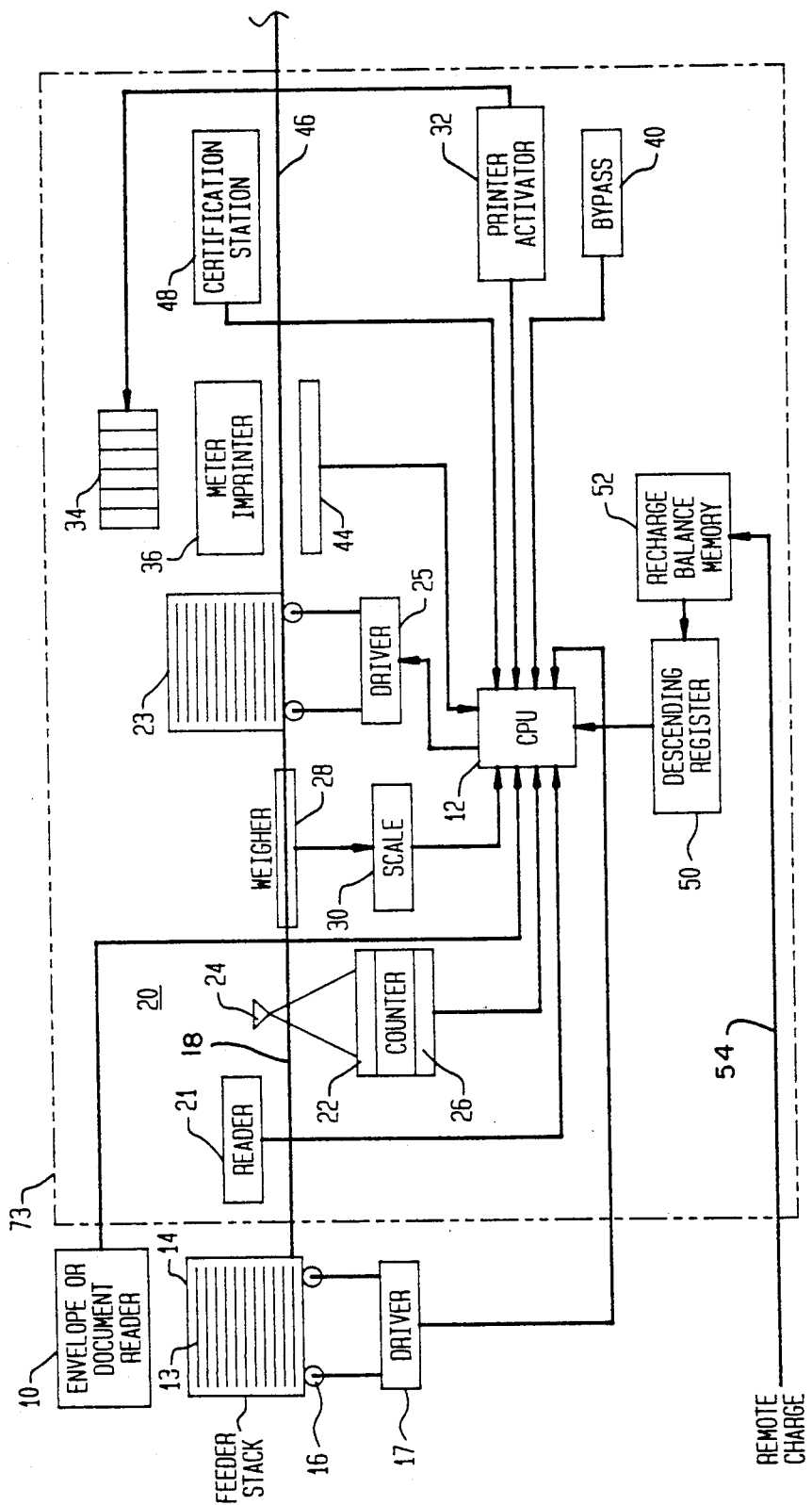
FIG. 1 is a block diagram illustrating the operations occurring within the certification device.

Referring to FIG. 1, a block diagram illustrative of apparatus for implementing the present invention is illustrated. Thus, transactional mail data, such as envelope or appropriate manifest data, is either read or keyed into the input device 10, and data regarding the same is fed to the CPU 12. The mail pieces 13 are placed in a feeder-stacker unit 14 of conventional construction where they are driven by appropriate feed rollers 16 on a mail path 18, first to an optical reader 21 coupled to the CPU 12 for reading data on the mail pieces such as destination zip codes. Other conventional reading devices may alternatively be employed. The reader 21 may of course alternatively be located after the weigher, to be described. Alternatively, or in addition, the mail pieces may be directed to a counter unit 20, which may consist of appropriate detecting means 22, such as an optical detector, energized by an optical source 24, the envelope passing along path 18 therebetween, for generating a count in the counter unit 26 and thence to the CPU 12. At the next station, the envelope is weighed, preferably on the fly for high speed operations, upon an appropriate scale mechanism, including a scale platform, 28. The scale is preferably a harmonic weigh on the fly type or the like, for high-speed operation, such harmonic scales being disclosed more fully in U.S. Pat. No. 4,778,018, assigned to the assignee of the present application. Other scales may also be suitably utilized. The scale platform cooperates with a weighing apparatus 30, the output data of which is fed to CPU 12. The scale may be calibrated for the U.S. Postal Service by Pitney Bowes and certified to be functioning accurately by Pitney Bowes. The scale may be periodically inspected, much in the manner of conventional postage meters, or may be inspected by telephone through appropriate modem links or the like.

Since the reduced postage in batch mailing depends upon the presence of at least a predetermined number of mail pieces for a given zip code, a queuing station 23 may be provided to hold all sequentially received mail pieces directed to a common destination zip code. If the required number are not queued, then the printer, to be described, will be controlled to print full postage of mail directed to the zip code, otherwise the printer may be controlled to print indicia in accordance with batch mail regulations.

The queuing station 23 may be provided with a driver 25, controlled by the CPU, to feed the mail pieces sequentially to the printer at such time that a determination of the correct postage has been made.

The CPU 12 responds to the weight data from scale 30, in accordance with a pre-stored program and postal data previously stored in a look up table in memory, for activating a printing activating mechanism 32 which sets print wheels 34, cooperating with meter imprinting station 36, for applying appropriate printed postal indicia data to the envelope as it traverses along the path 18 into the meter imprinting station. Normally before or concurrently with stamping, the value of the printed postage is debited from the descending register 50. In the event that the postage is already pre-printed, such information will have been placed into the CPU by the reader 10 and a bypass mechanism 40 will be activated causing the imprinting station to be inactive. Print confirmation signals of printing postal indicia from meter imprinter unit 36 are provided from print confirmation unit 44 to the CPU for appropriate error checking in a manner which is conventional. In the event of pre-printed postage, the counter 26 and scale 30 function to provide parameters which are compared to the previously stored data in the CPU 12 to determine the correctness of the pre-printed postage. In the event the postage is incorrect, the CPU 12 calculates the correct postage and decrements the descending register accordingly. Upon discharge of the mail pieces from the mail path 18, mail pieces then continue along path 46 to the certification station 48, where an appropriate certification stamp is placed upon the mail. The certification is a verification of correct postage accounting, as a function of mail count and/or weight and/or destination zip codes, or a combination thereof, depending upon the input condition established when the run began. Thus, certification provides a means for indicating that a mail piece has gone through a correct accounting process and should be delivered regardless of any apparent short payment. The certification also verifies that a correct debit was in fact performed by the postal organization. The certificate is placed upon the mail in human readable form and thus provides an indication to the postal service that appropriate adjustments have been made to the sender's descending register balances for any short-weighed or short-paid or otherwise incorrect postage which may have been placed upon the envelope.

Using standard RMRS techniques for meter charging, a recharge memory unit 52 may receive a recharge signal along line 54, from which the descending register 50 receives balance information regarding the initially charged total dollar balances.

It is of course apparent that the queuing station 23, driver 25 and reader 21 may be omitted if the system is not employed to process batch mail.

It is of course apparent that physical security is required in a system in accordance with the invention, to ensure for example that the mail piece that is certified correctly corresponds to the mail piece that was read, counted, weighed, etc. For this purpose the system of FIG. 2 may be enclosed in a secure housing 73.

Figure 2:
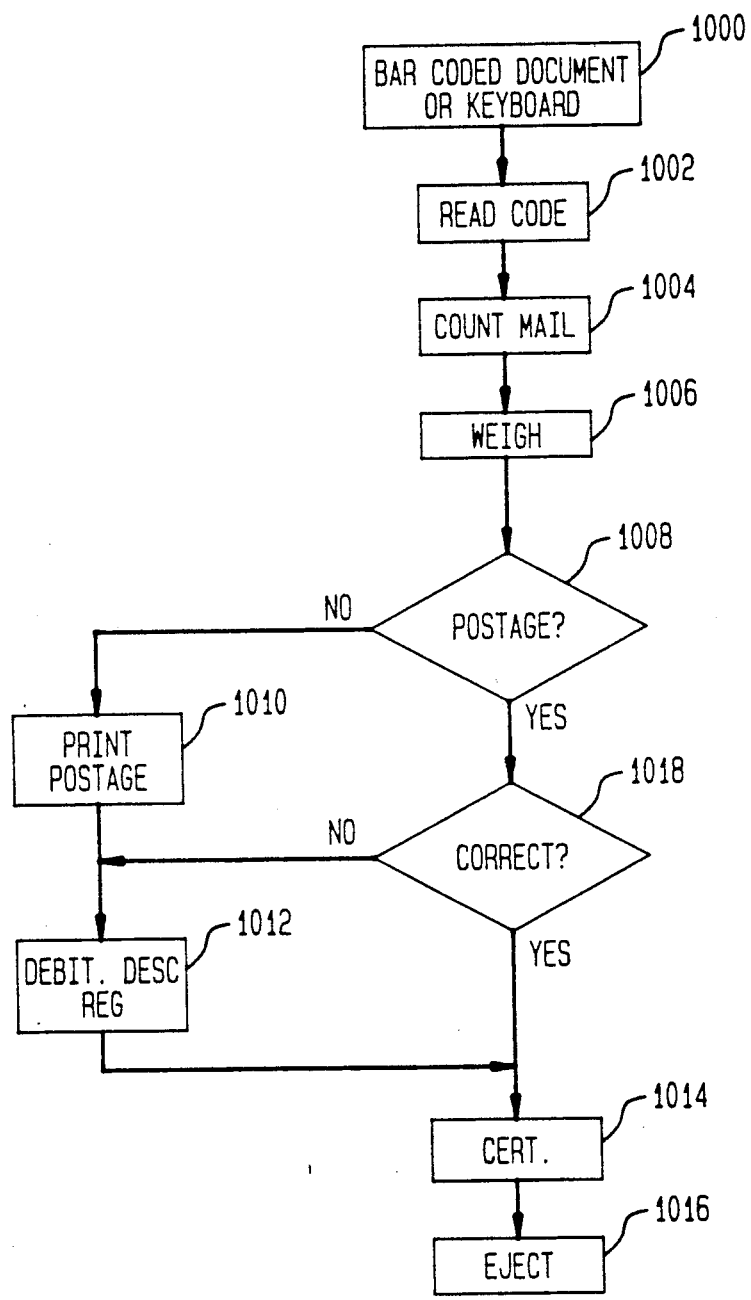
FIG. 2 is a block diagram illustrating the informational flow governing the processing by which the device in FIG. 1 operates.

Referring to FIG. 2, a flow chart indicating the general information processing operations occurring within the certified weigher is illustrated. Thus, in block 1000, the first step of providing appropriate transactional mail run data input to the device is indicated. The data input may occur either by keyboard entry or by appropriate bar code readers for inputting information regarding factors governing the conditions of a run, such as quantity of mail, weight, present discount, amount of postage pre-printed if any, and other such data. This information may be derived from the manifest, which is a summary of a particular mail run, or from the envelope itself, or from a mail piece for a windowed envelope. The information can also be provided by means of keyboard input, remote telephone links on any other input technique. Desired parametric operations, such as counting and weighing next occur. In the next block, 1002, the information read is placed in appropriate memory locations. In block 1004, a counting step occurs. In block 1006, the weighing step occurs. In decision block 1008, a decision is made as to whether the mail piece has postage already printed thereon or whether it does not. If it does not, the next step in the process takes place in block 1010 which prints postage on the mail piece. In block 1012, the descending registers are appropriately debited to reflect the amount of the postage printed. At this point, the mail piece now having the correct postage thereon is forwarded to block 1014 which is the certification block. In this block, appropriate certification is provided indicating that the mail has correct postage printed thereon and that the postage has been appropriately debited. Mail pieces are then ejected in suitable mechanism 1016. Returning to the decision block 1008, if postage has already been printed on the mail piece, the next decision block 1018 confirms whether the postage printed thereon is the correct postage based upon the count and weight data previously provided and if so, the confirmation is forwarded to block 1014. If the postage was not correct, then in block 1012 the descending registers are appropriately debited to reflect the correct postage. Since the mail piece now has been accounted for properly, even though the postage thereon may still appear to be incorrect, mail pieces are forwarded to the certification station, reflected in block 1014, where an appropriate certification stamp is placed on the mail piece certifying that the mail has correctly been accounted for in the descending register of the user. Mail pieces are then forwarded to the ejection station 1016 as before.

Figure 3:
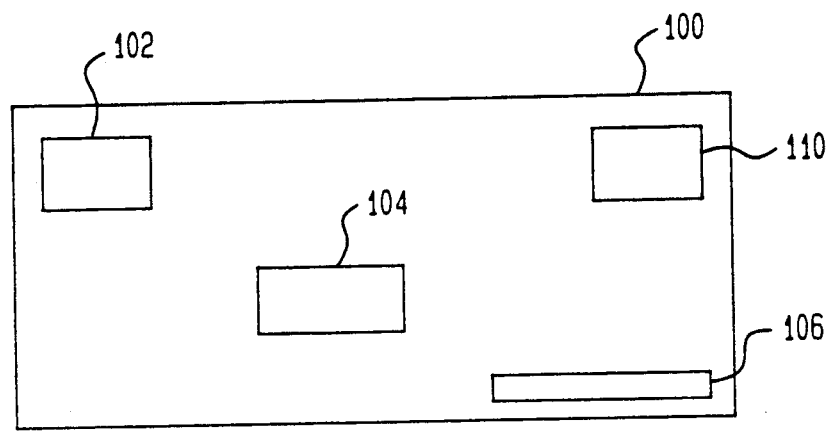
FIG. 3 is a plan view of a mail piece showing appropriate locations of both postal indicia and certification keys.

Referring to FIG. 3, an envelope of topical configuration is illustrated including a sender's address are 102 and destination address 104 and a certification coded area 106. The certification stamp will be placed in a manner which is human readable and will be relatively difficult to reproduce by any counterfeiting means. For this purpose encryption techniques utilizing coded data or other appropriate serial number techniques may be employed. Thus, for example, the envelope 100, which will also include a postage data area 110, may include within such postage data area 110 a serial number corresponding to the meter from which postage has been applied. The certification device 48, shown in FIG. 1, may also apply a specific serial number applied to area 106 which may bear an encrypted but non-apparent relationship between the meter number and the certification number. Such techniques are shown, for example, in co-pending application Ser. No. 320,844, filed Mar. 6, 1989. Utilizing this technique, by spot-checking or other methods such as statistical sampling techniques, postal service employees may validate the propriety of the certification stamp placed by certifying device 48 onto the envelop 100 in the area 106 with the postage meter, which has placed also an appropriate serial number into the area 110 by means of the meter imprinting device 36. Other encryption techniques for validating the authenticity of the certification stamp in the area 106 may also be employed, such techniques being disclosed in U.S. Pat. No. 4,878,246, filed May 2, 1988, which patent relates the verification of accuracy of the meter number based upon internal computational data relying upon encryption techniques, which techniques may also be equally applicable to certification stamp numbers appearing in the area 106. All of the foregoing U.S. patent applications are incorporated herein by reference.

The CPU unit may be an appropriate 8086 or 8088-based microprocessor unit, programmed to accomplish each of the functions set forth in the flow chart shown in FIG. 2.

Figure 4:
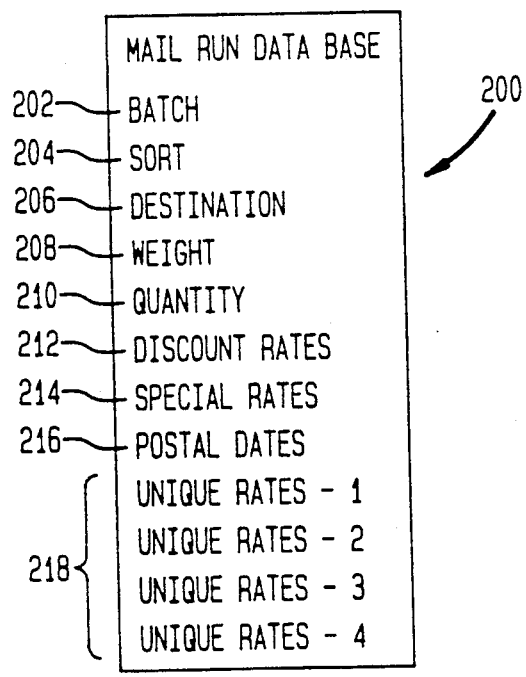
FIG. 4 is a plan view of mail run data base.

In instances where data is read from a manifest or other appropriate input devices, and wherein such data includes bulk mailing information, such as quantity of mail to be mailed, weight of mail, destination of mail and other factors, such data will be interpreted by the CPU prior to the beginning of a run, prior to activation of any certification. Thus, upon placement of the data relative to a specific bulk mail run, the CPU will upon appropriate checking for compliance with all input requirements for such bulk mail run, activate the driver unit 17 for activating the singulated feed of mail from the feeder stack 14. Mail is then counted, weighed, imprinted if not pre-postaged and verified if postage is already present, and the data relating to the count and weight correlated by the CPU in accordance with the input manifest data in the CPU. Referring to FIG. 4, an illustration is shown of a typical mail run data base 200 placed into the memory of the CPU. The mail run data base includes batch data 202, sort data 204, destination data 206, weight factors 208, quantity factors 210, discount rates 212, special rate factors 214 and regular postal rates 216. Provision can also be made for specific forms 218 of mailings having unique rate characteristics. At that point, the correct adjustment to the descending register indicating appropriate debit of the correct amount is made by the CPU. This debit will be unrelated to the actual postage pre-printed on the envelope. In the event that postage printed on the envelope is incorrect, due to for example weight beyond the bulk mail requirement, or additional mail beyond the count required for a specific bulk mail rate, or other such factors which would cause an incorrect bulk mail postage to have been applied, an appropriate adjustment is made in the descending register as to the correct amount and then a certification stamp placed upon the mail to indicate to the post office that there is no need for making an independent check to verify the actual postage. Thus, a substantial amount of post office servicing time will be eliminated. In addition, the requirement of returning mail for short payment to the sender is eliminated. Thus, costly acceptance procedures set forth by the post office for reviewing bulk mail requirements may also be eliminated.

Figure 5:
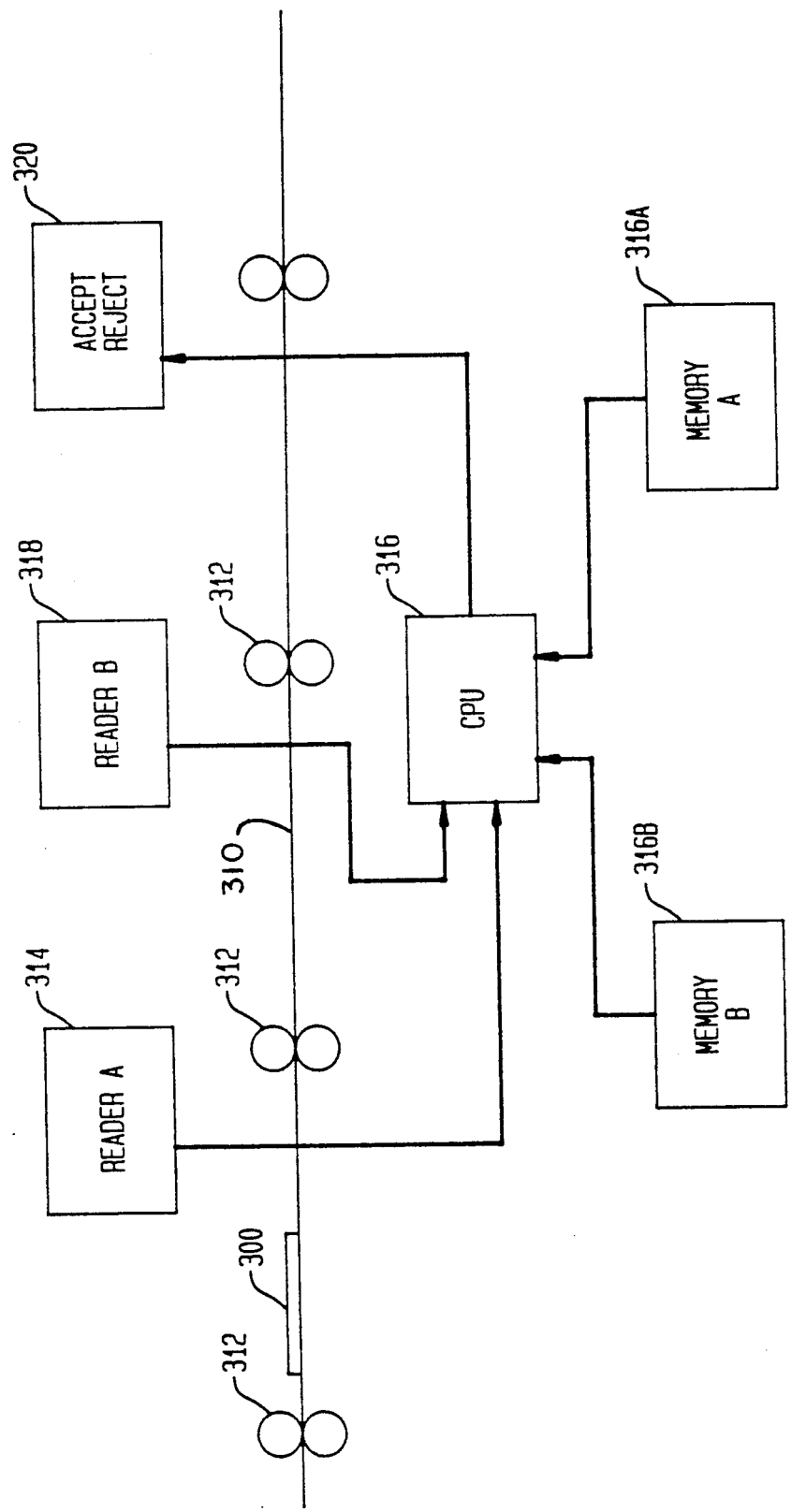
FIG. 5 is a general block diagram of a postal certification verification apparatus.

Referring to FIG. 5, a post office reader system is illustrated wherein the need for manually confirming certification is avoided. Thus, the mail piece 300 is directed along feed path 310 between nip roller 312 to reader A 314, which reads the pre-coded indicia provided in the postal imprint area 110 (FIG. 3). From this indicia is derived an identification code which is stored in CPU 316 memory 316A. The reader 314 may be optical or bar code. Upon receipt of the postal imprint indicia, the CPU checks to confirm the correctness of the indicia as conforming to an authorized postal meter certification apparatus, previously established by the user. The mail piece continues on the reader B 318, which reads the pre-coded indicia provided in the certification code which is stored in CPU 316 memory 316B. The CPU then performs a comparison interrelationship, utilizing encryption techniques such as are described in U.S. Pat. No. 4,878,246, assigned to the assignee of the present application, to confirm that the certification is authentic. Upon confirmation of authenticity the CPU 316 activates the accept/reject mechanism 320 for appropriate handling. It can also output to a printer (not shown) for generation of reports. It may also be used in determining by statistical means the sampling rates, quantities and the like.

Other modes of data confirmation may be employed to automatically confirm or verify the certification. The dual area read technique is particularly preferred since it permits either manual verification or automatic verification.

What is claimed:

1. A mailing system for accurate accounting for payment of mail pieces to be mailed, comprising: accounting means for storing data corresponding to postage funds, a source of mail pieces having postage imprinted thereon, certified weighing means for weighing said mail pieces, data processing means coupled to said accounting means and to said weighing means for determining postage required for mailing said mail pieces and reducing the postage funds in accordance with any difference between the determined postage required and the postage imprinted on said mail pieces, and printing means in communication with said data processing means for printing a human readable certification on said mail pieces for certifying that the data in said accounting means was modified to account for the proper postage required to mail said mail pieces.

2. A mailing system as claimed in claim 1 wherein said imprinted certification comprises an identification of said certified weighing means.

3. In mailing system for accounting for payment of postage of mail pieces to be mailed, including accounting means for storing data corresponding to unused prepaid postage funds, the improvement comprising: data processing means, means for applying data corresponding to a batch of mail having postage indicia printed thereon to said data processing means, said data processing means comprising means for determining the correct amount of postage for said batch of mail, means for determining the difference between said postage indicia and the correct amount of postage and means for modifying the data in said accounting means to account for the difference in postage required to mail the mail pieces of said batch of mail, and means for printing a certification on the mail pieces of said batch of mail that the data in said accounting means was accurately modified to account for said required postage, independently of any indicia on said pieces of mail.

4. A system for certifying correct postage on mail pieces comprising: a central processing unit, a source of mail pieces having postage imprinted thereon, input means for inputting data relating to postage on said mail pieces as determined by weight and quantity, means for feeding said mail pieces along a mail path, a counter for counting said mail pieces and connected to said central processing unit, a scale for weighing said mail pieces and connected to said central processing unit, said central processing unit responding to data from said input means, said counter and said scale and determining whether the postage imprinted upon said mail pieces is correct, means including a descending register coupled to said central processing unit for decrementing said descending register by the amount of any short postage determined by said central processing unit, and certifying means coupled to said central processing unit for placing a certification stamp upon said mail pieces for certifying said mail pieces as having complied with the conditions placed thereon in accordance with data provided by said input means.

5. The system of claim 4, further including means for applying postage information, said means for applying postage and said certification stamp scale.

6. The system of claim 4, wherein said system further comprises means for printing indicia on said mail pieces.

7. The system of claim 4, wherein the input data includes data corresponding to the number of sequential mail pieces having common destination zip codes.

8. The system of claim 4, wherein said certification comprises a human readable encryption.

9. The system of claim 8, wherein said human readable encryption is unique to said system.

* * * * *